(12) United States Patent
Leger et al.

(10) Patent No.: US 10,480,376 B2
(45) Date of Patent: Nov. 19, 2019

(54) UREA SENSOR PROTECTION ASSEMBLY AND UREA SENSOR SYSTEM

(71) Applicant: MEAS France, Toulouse (FR)

(72) Inventors: Vincent Leger, Toulouse (FR);
Armand Castandet, Toulouse (FR);
Dariga Toulon-Meekhun, Ramonville Saint Agne (FR)

(73) Assignee: MEAS France, Toulouse (FR)

( * ) Notice: Subject to any disclaimer, the term of this patent is extended or adjusted under 35 U.S.C. 154(b) by 0 days.

(21) Appl. No.: 15/910,675

(22) Filed: Mar. 2, 2018

(65) Prior Publication Data

US 2018/0252134 A1 Sep. 6, 2018

(30) Foreign Application Priority Data

Mar. 3, 2017 (EP) ..................................... 17305230

(51) Int. Cl.
| | | |
|---|---|---|
| *B01D 35/02* | (2006.01) | |
| *F01N 3/20* | (2006.01) | |
| *B01D 29/07* | (2006.01) | |
| *B01D 35/027* | (2006.01) | |
| *B01D 35/30* | (2006.01) | |
| *F01N 11/00* | (2006.01) | |

(52) U.S. Cl.
CPC ............. *F01N 3/208* (2013.01); *B01D 29/07* (2013.01); *B01D 35/027* (2013.01); *B01D 35/30* (2013.01); *F01N 3/2066* (2013.01); *F01N 11/00* (2013.01); *F01N 2530/18* (2013.01); *F01N 2610/02* (2013.01); *F01N 2610/1406* (2013.01); *F01N 2610/148* (2013.01); *F01N 2610/1426* (2013.01); *F01N 2610/1493* (2013.01); *Y02T 10/24* (2013.01)

(58) Field of Classification Search
CPC ......... F01N 2610/10; F01N 2610/1426; F01N 2610/148; F01N 2610/1486; F01N 2900/1814; F01N 2900/1818
See application file for complete search history.

(56) References Cited

U.S. PATENT DOCUMENTS

| | | | | |
|---|---|---|---|---|
| 2008/0247912 A1* | 10/2008 | Izutani | ................... | F01N 11/00 422/82.12 |
| 2014/0334983 A1* | 11/2014 | Yang | ..................... | F01N 11/00 422/119 |
| 2015/0033700 A1 | 2/2015 | Schlenke | | |

(Continued)

FOREIGN PATENT DOCUMENTS

| | | |
|---|---|---|
| EP | 2913494 A1 | 9/2015 |
| WO | 2011078692 A1 | 6/2011 |

OTHER PUBLICATIONS

European Search Report, dated Aug. 23, 2017, 5 pages.

*Primary Examiner* — Jonathan R Matthias
(74) *Attorney, Agent, or Firm* — Barley Snyder

(57) ABSTRACT

A urea sensor protection assembly for protecting a fluid sensor of a urea sensor system comprises an inner cage supporting the fluid sensor and an outer cage. The inner cage has a first fixation element fixing the inner cage to a common holder. The outer cage has a filter capable of blocking a plurality of air bubbles and/or allowing a fluid to pass and a second fixation element fixing the outer cage to the common holder. The inner cage is at least partially arranged in an inner volume of the outer cage in an assembled state.

16 Claims, 3 Drawing Sheets

(56) References Cited

U.S. PATENT DOCUMENTS

2015/0337708 A1* 11/2015 Schlenke .............. F01N 3/2066
                                                                               73/61.59
2017/0030241 A1    2/2017 Ryu et al.

* cited by examiner

UREA SENSOR PROTECTION ASSEMBLY AND UREA SENSOR SYSTEM

CROSS-REFERENCE TO RELATED APPLICATION

This application claims the benefit of the filing date under 35 U.S.C. § 119(a)-(d) of European Patent Application No. 17305230.9, filed on Mar. 3, 2017.

FIELD OF THE INVENTION

The present invention relates to a urea sensor system and, more particularly, to a urea sensor protection assembly for protecting a fluid sensor of the urea sensor system.

BACKGROUND

Known urea sensor systems are generally used in tanks for urea solutions such as diesel exhaust fluid (DEF) for diesel engines. The fluid sensors are used for monitoring certain properties of the urea solution in order to analyze the quality of the solution. However, certain circumstances may negatively influence the measurements. The urea solution tends to create bubbles during movement of the solution, for example, during filling of the urea tank. These bubbles may influence measurements of the fluid sensor. Particles formed by debris or frozen urea solution may also disturb measurements of the fluid sensor.

SUMMARY

A urea sensor protection assembly for protecting a fluid sensor of a urea sensor system comprises an inner cage supporting the fluid sensor and an outer cage. The inner cage has a first fixation element fixing the inner cage to a common holder. The outer cage has a filter capable of blocking a plurality of air bubbles and/or allowing a fluid to pass and a second fixation element fixing the outer cage to the common holder. The inner cage is at least partially arranged in an inner volume of the outer cage in an assembled state.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
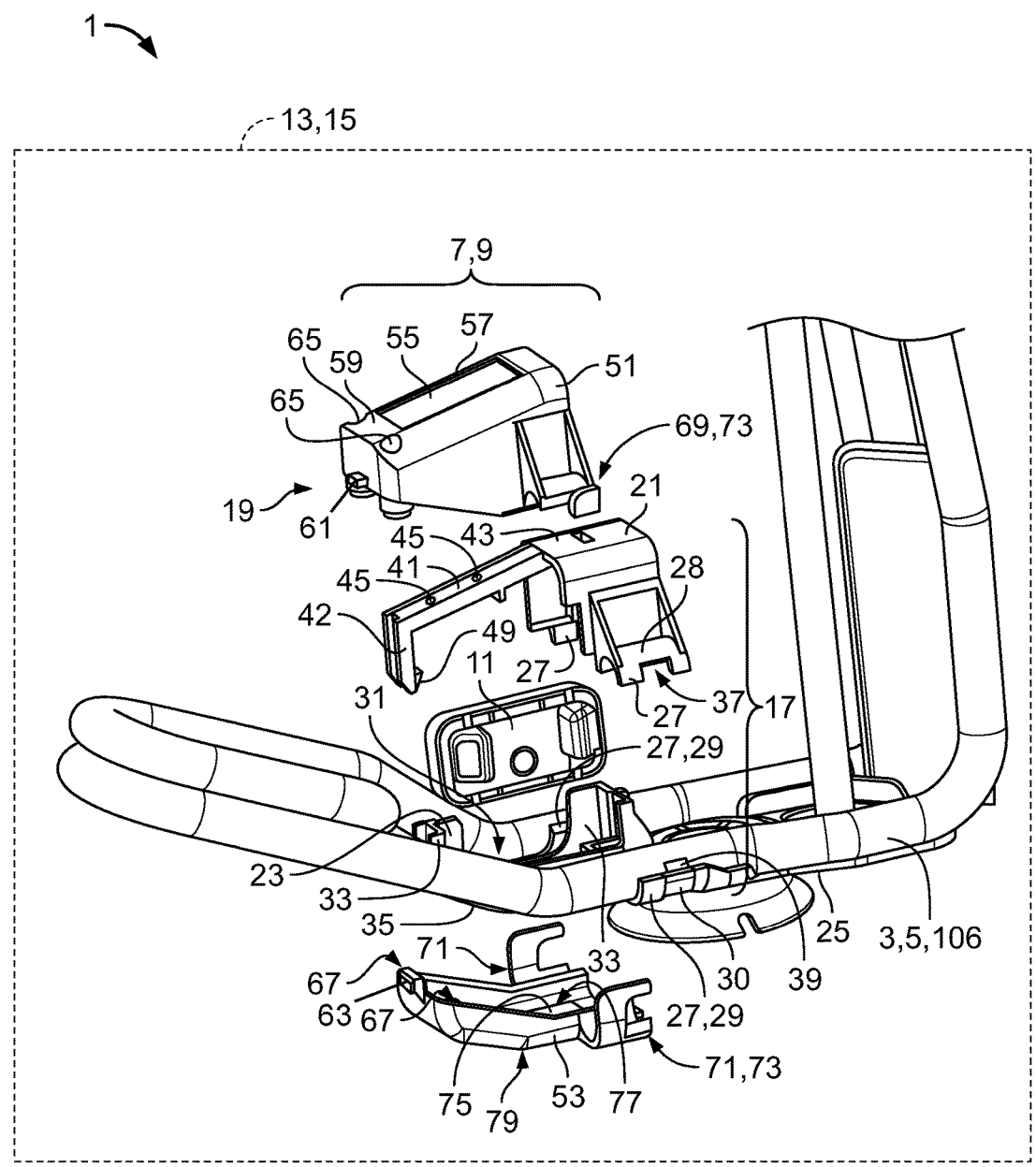
FIG. 1 is a fully exploded perspective view of a sensor system.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A urea sensor system 1 is shown in FIG. 1. The urea sensor system 1 has a tubular member 3 and a urea sensor assembly 7 connected to the tubular member 3. The major components of the invention will now be described in greater detail.

The tubular member 3, in the shown embodiment, is a heating tube 5. In other embodiments, the tubular member 3 is a suction tube or any other tubular member.

The urea sensor assembly 7, as shown in FIG. 1, has a urea sensor protection assembly 9 and a fluid sensor 11. In an embodiment, the fluid sensor 11 is an optical sensor, in particular a near infrared (NIR) sensor. In other embodiments, the fluid sensor 11 is a sensor working with visible light, such as a near infrared sensor, or a sensor working with other techniques such as ultrasonic sound or other means.

The urea sensor system 1, as shown in FIG. 1, may be used in a fluid tank 13. In an embodiment, the fluid tank 13 is a urea tank 15 which can be used for industrial and commercial transportation and for automotive applications, including commercial vehicles such as trucks, tractors and any other vehicles with combustion engines, for example, to provide diesel exhaust fluid (DEF) for diesel engines. Applications include any kind of mobile and/or stationary internal combustion engine.

The urea sensor protection assembly 9, as shown in FIG. 1, comprises an inner cage 17 for receiving the fluid sensor 11 and an outer cage 19. The inner cage 17 and the outer cage 19 are each composed of two parts in the shown embodiment.

The inner cage 17, as shown in FIG. 1, is composed of an upper part 21 and a lower part 23, which are each complementary to each other. The lower part 23 is formed integrally with a bottom plate 25 of the urea sensor system 1. The lower part 23 has lower fixation parts 30 complementary to the tubular member 3. The lower fixation parts 30 form receptacles 29 which, on their inner sides, have a cylindrical shape. The lower part 23 has a fluid sensor receptacle 31 for receiving the fluid sensor 11. The fluid sensor 11 is inserted into the fluid sensor receptacle 31 to a position in which it is seated in the receptacle 31 and supported by inner walls 33 of the receptacle 31. A bottom wall 35 of the lower part 23, which forms a lower end of the fluid sensor receptacle 31, has through holes allowing fluid to pass into the fluid sensor receptacle 31 in order to be analyzed by the fluid sensor 11.

The upper part 21, as shown in FIG. 1, has upper fixation parts 28 formed complementary to the lower fixation parts 30 of the lower part 23. The upper fixation parts 28 are also complementary to the tubular member 3 and resemble the shape of a cylindrical shell. Each of the fixation elements 27 of the upper part 21 is provided with a recess 37 into which a protrusion 39 which is arranged on each of the lower fixation parts 30 of the lower part 23 protrudes in an assembled state.

Figure 3:
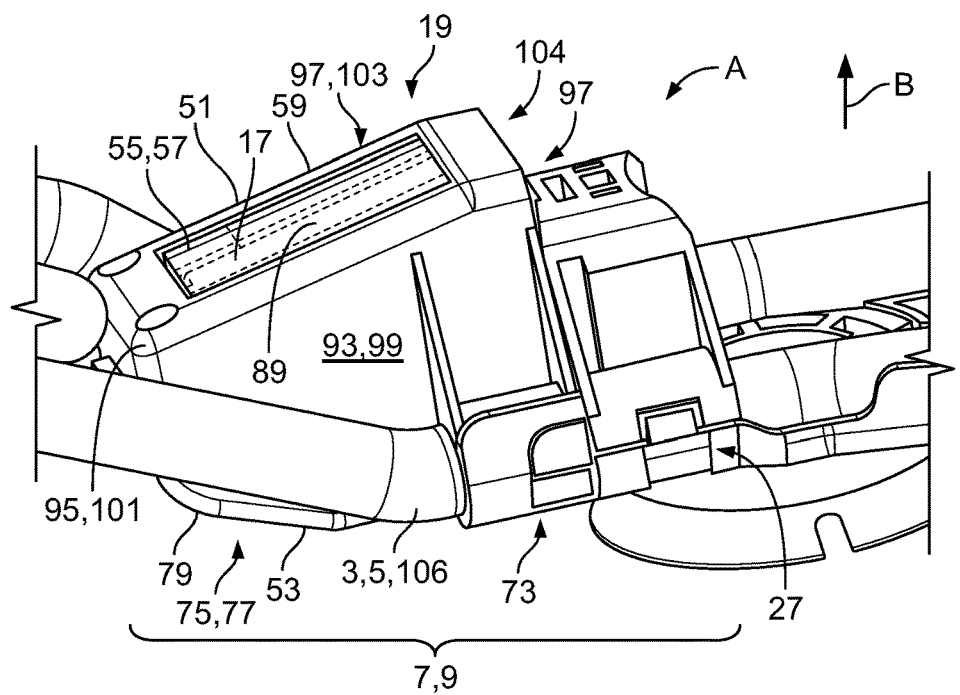
FIG. 3 is a perspective view of the sensor system in an assembled state.

In an assembled state A, shown in FIG. 3, the upper fixation parts 28 and the lower fixation parts 30 together form the fixation elements 27 of the inner cage 17. In an alternative embodiment, the recess 37 is arranged in the lower fixation parts 30 of the lower part 23 and the protrusion 39 is arranged in the upper fixation parts 28 of the upper part 21.

The upper part 21, as shown in FIG. 1, has a sensor retainer 41. The sensor retainer 41 fixes the fluid sensor 11 in the assembled state. The sensor retainer 41 is formed by an upper wall 43 of the upper part 21. The sensor retainer 41, and in an embodiment the whole upper wall 43, has passageways 45 for letting fluid pass to the fluid sensor 11. In the shown embodiment the passageways 45 are circles. In other embodiments, the passageways 45 may be any other appropriate shape and may be arranged in any appropriate number.

The sensor retainer 41, as shown in FIG. 1, extends away from the side of the upper part 21 which has the fixation elements 27 and has a bar-like shape. On its distal end, the sensor retainer 41 has an arm 42 with a latching hook 49. The latching hook 49 is adapted for being latched to the lower part 23; the lower part 23 has a complementary recess for receiving the latching hook 49.

The outer cage 19, as shown in FIG. 1, has an upper cover 51 and a lower cover 53 complementary to one other. The upper cover 51 has a filter 55 which is semi-permeable and formed by a mesh material. The filter 55 is adapted for letting fluid, in particular a urea solution, to pass while blocking air bubbles and/or particles such as debris or ice. The filter 55 is arranged in a window opening 57 in an upper wall 59 of the upper cover 51. The upper cover 51 has a locking protrusion 61 which is adapted for being inserted into a complementary shaped locking opening 63 formed in the lower cover 53. The upper cover 51 has screw receiving canals 65 for receiving screws which can be connected to the lower cover 53. The lower cover 53 has inner threads 67 for screws which extend through the screw receiving channels 65 to be fixated to the screws. The upper cover 51 is thereby permanently connected to the lower cover 53.

For fixating the outer cage 19 to the heating tube 5, the upper cover 51 has upper fixation parts 69 and the lower cover 53 has lower fixation parts 71. The upper fixation parts 69 are complementary to the lower fixation parts 71 and, in an assembled state, form fixation elements 73 of the outer cage 19. The upper fixation parts 69 and the lower fixation parts 71 are each shaped such that they can receive the heating tube 5 in parts; the upper fixation parts 69 and the lower fixation parts 71 each have an approximately cylindrical shape.

The lower cover 53 has a filter 75. The filter 75 has similar properties as the filter 55 of the upper cover 51. The filter 75 of the lower cover 53 is arranged in a window opening 77 in a lower wall 79 of the lower cover 53.

Figure 2:
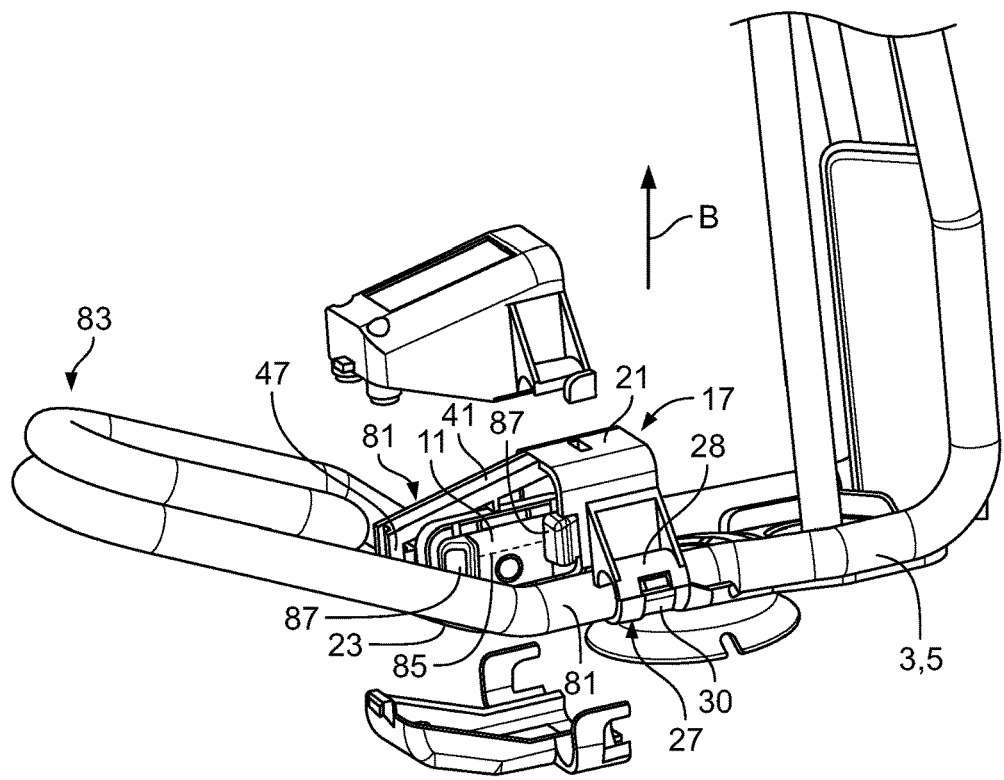
FIG. 2 is a partially exploded perspective view of the sensor system.

The inner cage 17, as shown in FIG. 2, is assembled by the connection between the upper part 21 and the lower part 23. The inner cage 17 is fixated to the tubular member 3 is the heating tube 5 by the fixation elements 27. The fixation elements 27 are formed by connecting the upper fixation part 28 of the upper part 21 with the lower fixation part 30 from the lower part 23. The protrusion 39 is received in the recess 37. The latching hook 49 of the arm 47 on the sensor retainer 41 is received in a complementary shaped part of the lower part 23. The fluid sensor 11 is supported by the inner cage 17. Thereby, the upper part 21 with the sensor retainer 41 fixates the fluid sensor 11 on the lower part 23. In an embodiment, the fluid sensor 11 is arranged between two parallel sections 81 of the tubular member 3 and is spaced apart from a loop section 83 of the tubular member 3.

The sensor 11 has at least one optical path 85 which is indicated by a dashed line in FIG. 2. Light transmitted by a light transmitting device of the fluid sensor 11 can travel along the optical path 85 to a light detecting device of the fluid sensor 11. In the shown embodiment, the fluid sensor 11 is shown with two optical components 87 which can comprise light emitting and/or light detecting devices. The fluid sensor 11 is arranged such that the optical components 87 and the optical path 85 face the tubular member 3. The optical path 85 is approximately parallel with the tubular member 3. Consequently, fluid passes parallel to the bubble ascension direction B between the optical components 87 and gas bubbles may easily leave the area around the optical path 85 without being blocked by an optical component 87.

The urea sensor system 7 and the urea sensor protection assembly 9 are shown in the assembled state A in FIG. 3. In the assembled state A, the upper cover 51 and the lower cover 53 of the assembly 9 are connected to each other to form the outer cage 19. The inner cage 17 is arranged in an inner volume 89 of the outer cage 19. The upper cover 51 and the lower cover 53 jointly form a receptacle 91 for the inner cage 17.

The outer cage 19, as shown in FIG. 3, is closed at three sides 93, 95 and 97 formed by solid side walls 99, 101 and 103. Since the outer cage 19 includes the upper cover 51 and the lower cover 53, the side walls 99, 101 and 103 are also formed of two parts each. The side wall 99 is opposite to the optical components 87 of the fluid sensor 11 and blocks ambient light such that the fluid sensor 11 is not disturbed by the ambient light. The side wall 99 is formed of a non-metallic and/or non-reflective material such that reflections on the side wall 99 are also prevented.

The outer cage 19 is closed by the lower wall 79 and the upper wall 59 as shown in FIG. 3. As already mentioned, these walls 59 and 79 comprise window openings 57 and 77 with filters 55 and 75. The filters 55 and 75 allow fluid to pass through the window openings 57 and 77 and to reach the inner volume 89 of the outer cage 19 such that the fluid can be analyzed by the fluid sensor 11. At a sixth side 104, the outer cage 19 is closed by the inserted inner cage 17.

The inner cage 17 and the outer cage 19, as shown in FIG. 3, are fixated separately on the tubular member 3, which acts as a common holder 106 for the cages 17 and 19. Thereby, the inner cage 17 is fixated by the fixation elements 27 whereas the outer cage 19 is fixated by the fixation elements 73. The fixation elements 27 and 73 abut each other on the tubular member 3. This abutment may help to align the inner cage 17 and the outer cage 19 relatively to each other. Due to the separate fixation of the inner cage 17 and the outer cage 19, the weight of the outer cage 19 does not have to be carried by the inner cage 17 which carries the fluid sensor 11, reducing stress on the inner cage 17 and the fluid sensor 11.

Figure 4:
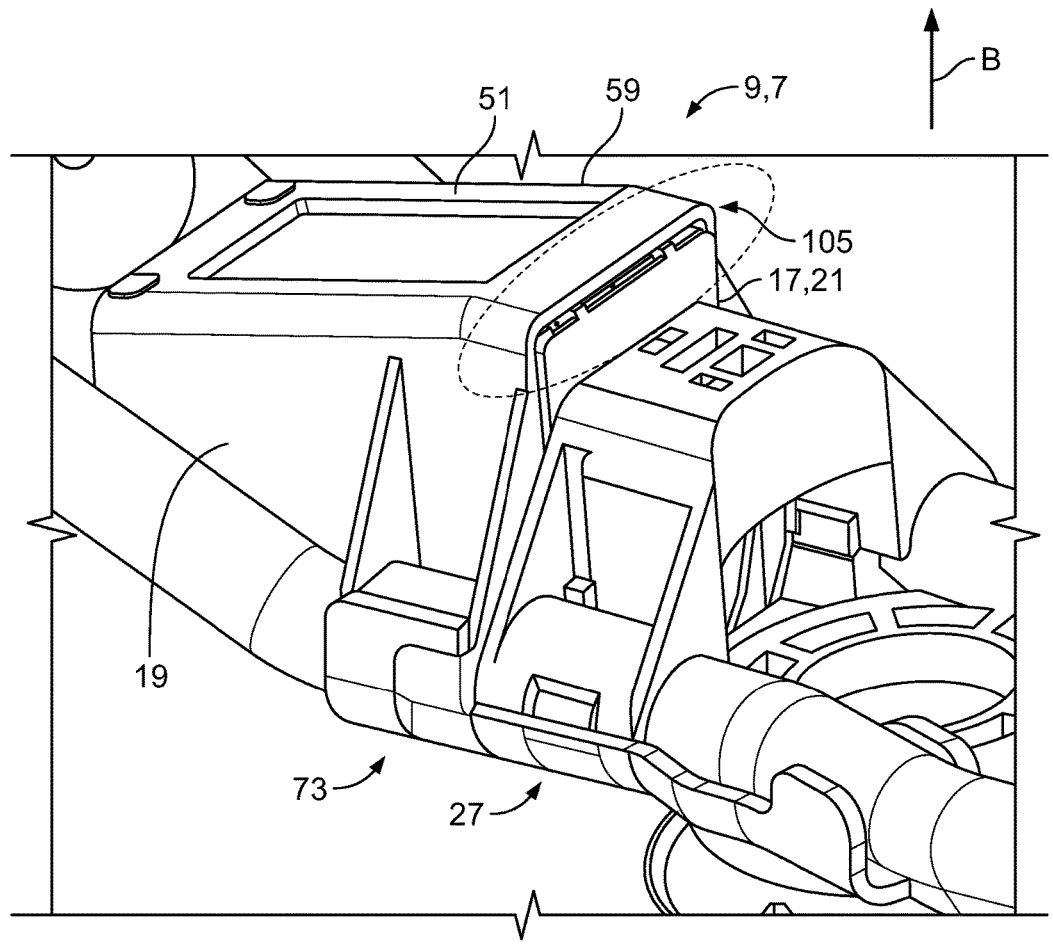
FIG. 4 is another perspective view of the sensor system in the assembled state.
Figure 5:
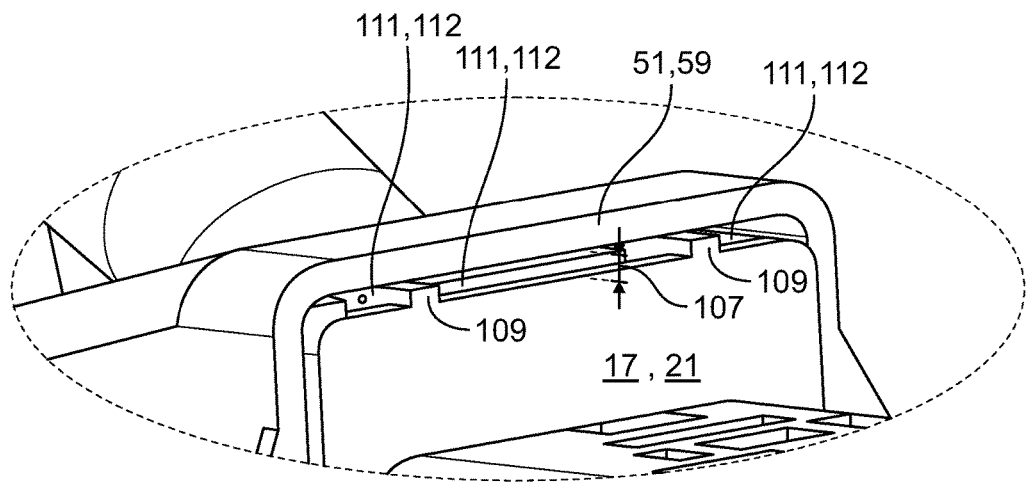
FIG. 5 is an enlarged perspective view of a portion of FIG. 4.

As shown in FIGS. 4 and 5, the upper wall 59 of the upper cover 51 is inclined and rises in the bubble ascension direction B. At the end 105 of the upper wall 59 which faces in the direction of the fixation elements 27 of the inner cage 17, the upper wall 59 is spaced apart from the upper part 21 of the inner cage 17; gaps 112 are formed between the upper cover 51 and the upper part 21. In order to keep the distance 107 between the upper wall 59 of the upper cover 51 and the upper part 21 of the inner cage 17, spacers 109 are arranged between the upper part 21 and the upper cover 51. The spacers 109 are formed monolithically with the upper part 21. In other embodiments, at least one of the spacers 109 may also be formed monolithically with the upper cover 51.

Between the upper part 21 and the upper cover 51, three bubble outlet openings 111 are formed by the gaps 112 as shown in FIG. 5. The bubble outlet openings 111 allow bubbles to leave the urea sensor protection assembly 9 in order not to disturb the measurements of the fluid sensor 11. The inclined upper wall 59 guides bubbles towards the bubble outlet openings 111. In other embodiments, the upper wall 59 extends approximately perpendicular to the bubble ascension direction B. The lower wall 79 of the outer cage 19 has at least one debris outlet opening in order to let particles such as debris or ice to leave the outer cage 19 by gravitational force.

The filters 55, 75 and the size of the bubble outlet openings 111 are chosen such that fluid may pass through the outer and inner cages 17, 19 at a moderate flow rate, preventing strong thermal gradients from occurring inside the assembly 7. If, for example, the temperature of a fluid in the fluid tank 13 changes rapidly, the fluid inside the assembly 7 will follow the temperature changes slowly in order to even out peaks in the temperature profile.

What is claimed is:

1. A urea sensor protection assembly for protecting a fluid sensor of a urea sensor system, comprising:
    an inner cage supporting the fluid sensor and having a first fixation element fixing the inner cage to a common holder;
    an outer cage having a filter capable of blocking a plurality of air bubbles and/or allowing a fluid to pass and a second fixation element fixing the outer cage to the common holder, the inner cage at least partially arranged in an inner volume of the outer cage in an assembled state; and
    a bubble outlet opening formed by a gap between the inner cage and the outer cage.

2. The urea sensor protection assembly of claim 1, wherein the outer cage has an upper cover and a lower cover, the upper cover and the lower cover jointly forming a receptacle for the inner cage.

3. The urea sensor protection assembly of claim 2, wherein the upper cover and the lower cover each have at least one filter.

4. The urea sensor protection assembly of claim 2, wherein the upper cover has an upper wall extending perpendicular to a bubble ascension direction toward the bubble outlet opening.

5. The urea sensor protection assembly of claim 2, wherein the upper cover has an upper wall which extends inclined with respect to a bubble ascension direction toward the bubble outlet opening.

6. The urea sensor protection assembly of claim 1, wherein the first fixation element and/or the second fixation element is clamped to a tubular member of the sensor system.

7. The urea sensor protection assembly of claim 1, wherein the bubble outlet opening is disposed above the inner cage in a bubble ascension direction.

8. The urea sensor protection assembly of claim 1, wherein the inner cage and the outer cage are spaced apart by a spacer to form the bubble outlet opening.

9. The urea sensor protection assembly of claim 1, wherein the outer cage is closed at on at least three sides of the outer cage.

10. The urea sensor protection assembly of claim 9, wherein the inner cage is inserted into the outer cage through a side other than the at least three closed sides.

11. The urea sensor protection assembly of claim 9, wherein the at least three sides are each a solid side wall of the outer cage.

12. A urea sensor arrangement, comprising:
    a fluid sensor; and
    a urea sensor protection assembly including
        an inner cage having a first fixation element fixing the inner cage to a common holder, the fluid sensor arranged inside the inner cage;
        an outer cage having a filter capable of blocking a plurality of air bubbles and/or allowing a fluid to pass and a second fixation element fixing the outer cage to the common holder, the inner cage at least partially arranged in an inner volume of the outer cage in an assembled state; and
        a bubble outlet opening formed by a gap between the inner cage and the outer cage.

13. A urea sensor protection system, comprising:
    a tubular member disposed in a fluid tank; and
    a urea sensor protection assembly including
        an inner cage supporting a fluid sensor and having a first fixation element fixing the inner cage to the tubular member;
        an outer cage having a filter capable of blocking a plurality of air bubbles and/or allowing a fluid to pass and a second fixation element fixing the outer cage to the tubular member, the inner cage at least partially arranged in an inner volume of the outer cage in an assembled state; and
        a bubble outlet opening formed by a gap between the inner cage and the outer cage.

14. The urea sensor protection system of claim 13, wherein the first fixation element abuts the second fixation element on the tubular member.

15. The urea sensor protection system of claim 13, wherein the inner cage is disposed between a pair of parallel section of the tubular member.

16. The urea sensor protection assembly of claim 15, wherein the inner cage is spaced apart from a loop section of the tubular member.

* * * * *